Feb. 23, 1954 F. A. MASHERIS ET AL 2,670,416
VARIABLE SPEED GOVERNOR
Filed April 22, 1948 2 Sheets-Sheet 1
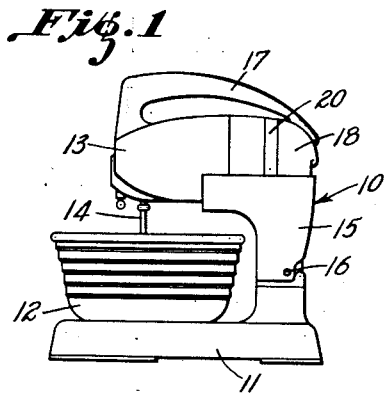
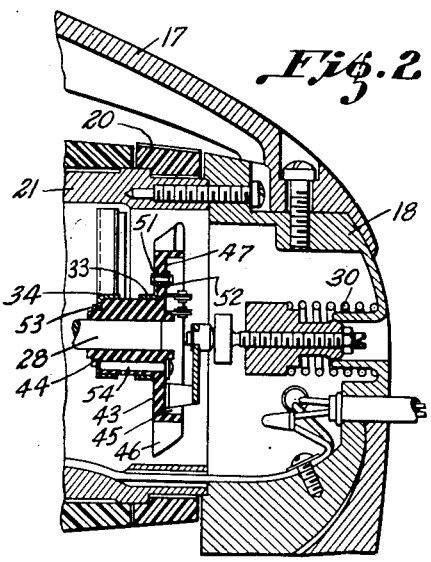
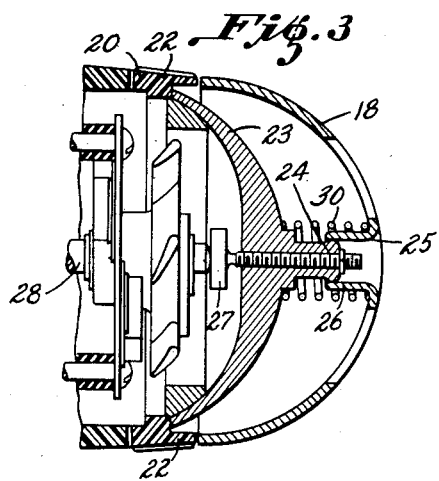
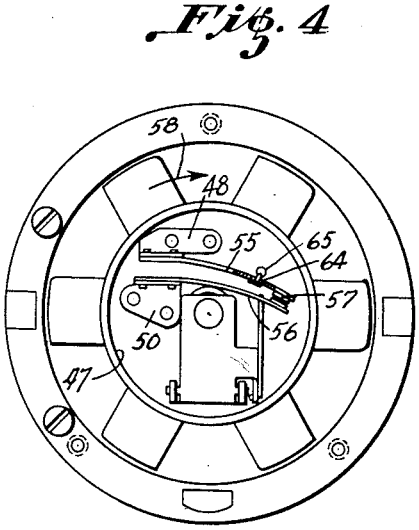
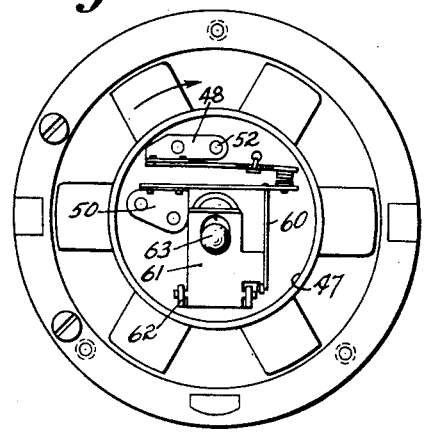
Inventors:
KALMAN TANKO &
FRED A. MASHERIS
BY
Attorney:

Feb. 23, 1954     F. A. MASHERIS ET AL     2,670,416
VARIABLE SPEED GOVERNOR
Filed April 22, 1948     2 Sheets-Sheet 2
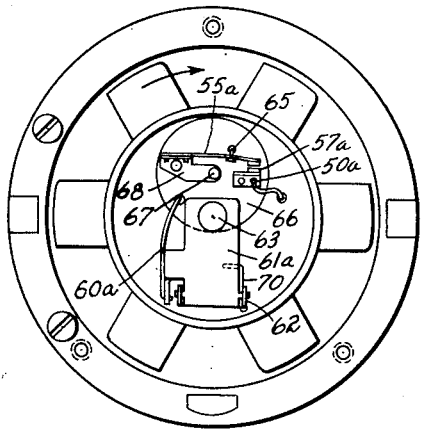
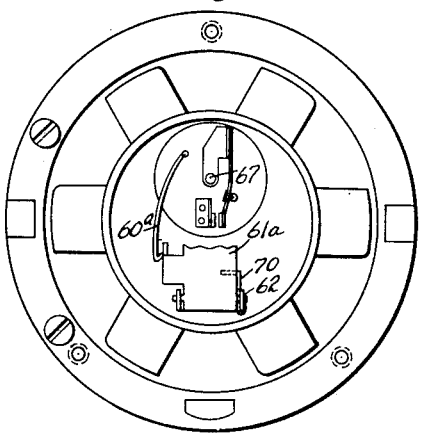
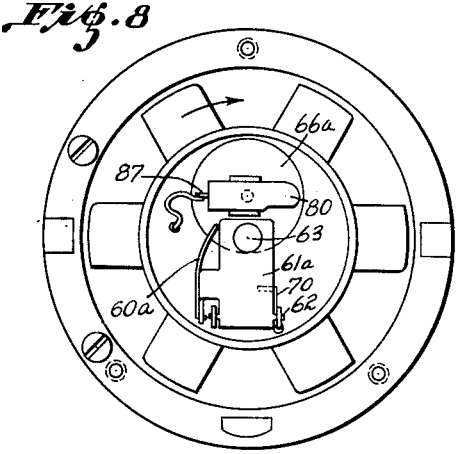
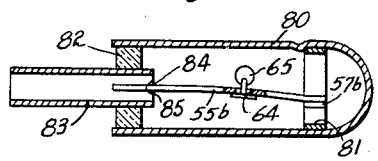
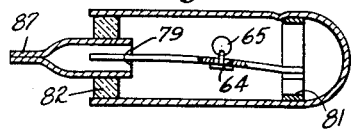
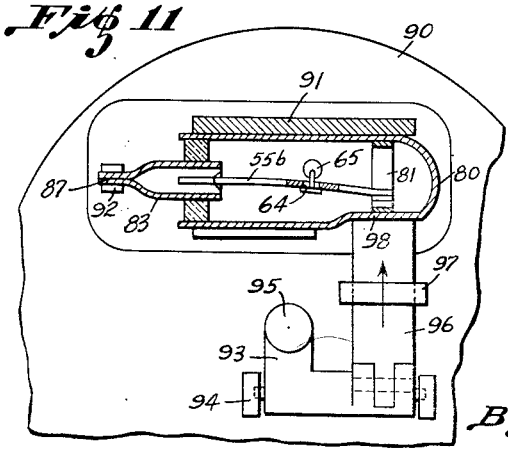
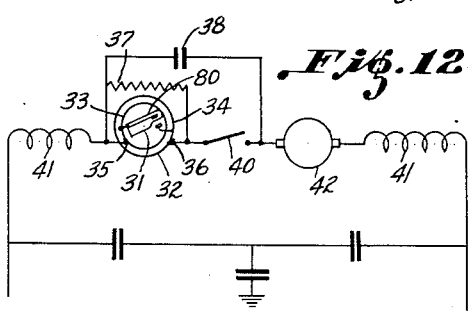
Inventors:
KALMAN TANKO &
FRED A. MASHERIS
BY Ivaton D. Harbaugh
Attorney Patented Feb. 23, 1954

2,670,416

UNITED STATES PATENT OFFICE 2,670,416

VARIABLE SPEED GOVERNOR

Fred A. Masheris and Kalman Tanko, Chicago, Ill., assignors to Dormeyer Corporation, Chicago, Ill., a corporation of Illinois Application April 22, 1948, Serial No. 27,044

23 Claims. (Cl. 200—80)

The invention relates to speed control governors for electric motors, and more particularly to speed governors which are subjected to and influenced by centrifugal force.

Although the invention is shown and described in connection with food mixers, it may be used with motors in other devices also.

In order to understand the invention, and particularly its application to food mixers, it should be noted that food mixers have, for a long time, employed two interdigitating beaters for the food mixing and beating operations generally encountered in home kitchens. Series wound fractional horsepower motors are favored because of the advantages derived from the torque speed characteristics of these motors, their adaptability to speed control, and their universal availability for A. C. and D. C. current operation.

Armature speeds on such motors run as high as 20,000 R. P. M. but generally have a top speed in the neighborhood of 14,000 to 16,000 R. P. M. when they are driving gear trains such as those normally used in food mixers.

It has been found that the top speed of the interdigitating beaters should be in the neighborhood of 1000 R. P. M. and this requires a gear reduction ratio between the armature shaft and the beater shafts of approximately 15 to 1.

In order for the food mixers to have a general all-round use in the kitchen, lower beater speeds are required and the range of governed speeds heretofore provided extends from 1000 R. P. M. down to 300 R. P. M. depending upon the task to be performed. This is accomplished by centrifugal governors interrupting all or part of the electric current impressed upon the motor so that the speed is infinitely variable within the range. These centrifugal governors constitute a switch connected in series with the motor circuit to break the circuit and slow the motor when the motor speed rises above a certain speed, and to close the circuit and speed up the motor when the motor speed falls below a predetermined speed. It is essentially a hunting action whose constancy is dependent upon the efficiency of the governor.

Centrifugal governors heretofore employed have been generally of two types. One type comprises nonrotating switch contacts, one of which is displaced by a train of elements actuated by a centrifugal responsive device driven by the armature shaft of the motor. With this type, however, friction present in the train of moving elements detracts materially from satisfactory performance. The other type comprises rotating switch contacts, one of which is displaced by the action of centrifugal force applied directly thereto. This latter type is probably the better of the two but it still is not satisfactory at the lower speeds, particularly where A. C. currents are employed. In fact, the 300 R. P. M. lower limit heretofore provided is the minimum speed possible with present centrifugal governors without encountering objectionable pulsation, spurting or loping of the motor, arcing at the switch contacts and a hammering effect of the mixer.

At this minimum speed of 300 R. P. M. the beaters do not correctly fold ingredients into food mixtures. Food ingredients, especially dry ingredients such as flour, are thrown out of the bowl when they are supposed to be folded into the mixture, and furthermore this speed is not low enough for many food mixing operations such as the stirring and beating of candy, the mashing of potatoes, the folding of egg whites into batter, etc.

Consequently, the industry has long felt the need of a governor of the current interruptance type which will function simply and satisfactorily throughout a speed range which extends as low as 100 R. P. M. for the beater shafts of interdigitating beaters.

By way of understanding this problem better, it should be noted that conventional centrifugal control switches are connected in series with the motor circuit and in parallel with both a ballast resistance and a spark suppressing condenser. Reference is hereby made to the Behar Patent No. 2,262,912 for a more complete explanation thereof. Furthermore, as pointed out in the Lee Patent No. 2,103,589, the switches heretofore used vibrate to make and break the circuit at a rate of from 50 to 300 times a second. The rate is lower when the motor is not operating under a load and also varies with the ohms present in the ballast resistor. If the resistance is high, in the neighborhood of 250 ohms, the switch makes and breaks with greater frequency than if the resistor is 150 ohms. On the other hand, the lower the resistance is, the greater the heat generated in it because the motor runs more upon the resistance.

It has been found in connection with the present invention that approximately 200 ohms is the preferred minimum resistance to be connected in parallel with the switch contacts in order to attain a minimum beater speed of 100 R. P. M. with a motor whose stall amperage is approximately 5 amperes 117 volts D. C. It is also to be noted with slower rates of make and break vibration, that the contacts remain closed longer and remain open longer each make and break.

With a 200 ohm resistance, the nonloaded make and break frequency of the centrifugal switch at 300 R. P. M. beater speed is conventionally less than 100 times a second, depending somewhat upon the length of the leaf spring which supports the centrifugally displaced contact. This causes the motor to spurt and lope due to the fact that the makes persist too long and the breaks are not spaced evenly. Furthermore, the makes and breaks tend to group themselves due to the harmonic vibration of the resilient element subjected to the centrifugal force. Not only is this tendency to group a factor in causing pulsations or spurts of the motor at the lower speeds but when the governor is moved to provide higher speeds, or where the governor make and break vibration is higher than 100 times a second, this tendency to group approaches a frequency of approximately 60 cycles at middle speeds and causes an audible frequency beat effect in the motor when the motor is connected to 60 cycle A. C. current. This is particularly true where the tension on the resilient element of the governor is centrifugally or manually varied throughout that particular part of the speed range.

The shorter the spring is, of course, the greater will be the frequency, provided the shortness of the spring is not counteracted by a substantial weight increment on the spring creating a lower frequency. But the spring cannot be short enough in conventional constructions to do much good. The wide range of speeds over which the governor performs and the necessary bodily displacement of associated elements employed, requires that the spring supporting the centrifugal contact be of sufficient length that it will not fatigue or be extended beyond its elastic limit by the widely varying tensions and flexure loads imposed upon it throughout its range of adjustment. Thus, being confronted with these difficulties, shorter springs to increase the frequency of current interruptance have not been possible heretofore and the 300 R. P. M. beater speed has been considered to be minimum for governors on food mixers compatible with acceptably smooth running operation of the motor.

In the present invention beater speeds can be provided as low as 100 R. P. M. without sacrificing any smoothness of operation or motor power, the shunting resistance remaining for example at 200 ohms. However, since 100 R. P. M. beater speed is well below that which is practical for operating interdigitating beaters, and is mentioned here for comparison and other possible applications, the lowest limit that may be desired can now be provided in food mixers quite easily. Preferably, it is from 150 to 200 R. P. M. on the beater shafts. Translated into armature speeds, the lowest limit thus is less than 3000 R. P. M., which speeds are over a third less than that heretofore conventionally attainable with acceptable results in food mixers.

A further object of the invention resides in imposing upon a resilient member capable of vibrating with a harmonic cycle, a secondary element which is carried thereby loosely enough that it destroys the harmonic cycling by being a foreign element opposing same, yet is not sufficiently heavy to set up a dominant harmonic cycling of its own.

Another object of the present invention is to eliminate the tendency of a centrifugally influenced governor to group its makes and breaks with recurring frequency.

Another object of the invention is to provide a speed governor which operates smoothly and evenly throughout the range of from 1500 R. P. M. to 15,000 R. P. M. armature speeds.

Another object of the invention is to provide a predetermined tension between centrifugally actuated switch contacts and maintain said tension constant throughout a wide range of speed controlling adjustments.

Another object of the invention is to provide a food mixer which operates smoothly and efficiently at speeds low enough that dry ingredients are not thrown out of the bowl by the beaters and at which whipped egg whites can be folded into a mixture without deleterious effects.

Another object of the invention is to provide a centrifugally influenced current interrupter switch which provides over 300 makes and breaks a second even at low speeds, without cycling effect.

Another object of the invention is to eliminate all possible contamination, fouling or momentary arcing during the make and break of a centrifugally influenced switch contact by disposing the contacts in a sealed inert atmosphere, preferably under arc suppressing pressures.

A further object of the invention resides in providing a centrifugally responsive switch of a predetermined speed setting for interchangeable use in food mixers without need for correction adjustments in the train of elements by which the governor is controlled.

Another object of the invention is to provide a centrifugal speed governor capable of controlling the speed of a motor throughout a wide range of speeds without disturbing the dynamic balance of the motor throughout the range.

The invention is further characterized by rotating the centrifugal governor in a direction whereby inertia of the centrifugally influenced switch contact is employed to assist in closing the contacts when the motor begins to slow up after an opening of the contacts.

Other objects of the invention, including simplicity of construction and operation will appear from the drawings, the description relating thereto, and the appended claims.

Referring now to the drawings:

Fig. 1 is a side elevational view of a food mixer in which is embodied the present invention;

Fig. 2 is an enlarged cutaway view of a portion of the device shown in Fig. 1 exposing to view partly in section a speed governor construction embodying the invention;

Fig. 3 is a view of the construction shown in Fig. 2 partly in section as taken upon a horizontal medial plane;

Fig. 4 is an end view of the governor shown in Figs. 2 and 3 as disposed in its normal resting position;

Fig. 5 is a view similar to Fig. 4 illustrating the position of the contacts and supporting elements when the governor is in operation at a comparatively high speed;

Fig. 6 is a view similar to Fig. 4 showing a modification of the invention when set to run at a low speed;

Fig. 7 is a view similar to Fig. 6 illustrating the position of the embodiment shown in Fig. 6 when set to run at high speeds;

Fig. 8 is an end view of another modification of the invention when positioned to control the operation of the motor at low speeds;

Fig. 9 is a section taken through the switch element shown in Fig. 8 in an early stage of its construction;

Fig. 10 is a view similar to Fig. 8 showing the invention at a subsequent stage of construction;

Fig. 11 illustrates the setting of the device shown in Fig. 10 preliminary to its installation in a food mixer; and Fig. 12 is a diagrammatic showing of a preferred form of a motor circuit of which the invention forms a part.

The invention as embodied for purposes of description involves a leaf spring supporting a switch contact eccentrically to an axis of rotation to subject it to centrifugal forces that operate to separate it from a cooperating contact above a certain speed and to close it against the other contact below said predetermined speed, which speed is selectively determinable at will. The spring is preferably under initial tension and is also subjected to further tension due to centrifugal force acting upon it. An element is mounted loosely upon the spring intermediate its ends and in the preferred form the spring is apertured intermediate its ends to receive the element therethrough in loose relationship, which element is of sufficient weight to break up harmonic action of the spring but of insufficient weight to establish a secondary dominating harmonic. In order to assist this loose element in its dampening operation it is preferred to rotate the contacts in a direction ahead of the spring support so that inertia of both the loose element and the centrifugally influenced contact tend to close the contacts again when the motor momentarily begins to slow down after a separation of the contacts. Furthermore, in two of the embodiments illustrated it is preferred to provide a short spring of high frequency vibration characteristics and not to vary the relative tension between the switch contacts throughout the range of speed adjustment, but rather to vary the amount of centrifugal force to which the movable contact is subjected so that a make and break frequency for the contacts is provided above 300 makes and breaks a second and which can be maintained at beater speeds as low as 100 to 150 R. P. M.

Referring more particularly to the drawings, a food mixer such as that disclosed in the Bisley application Serial No. 755,995, now Patent No. 2,615,691, issued October 28, 1952, reference to which is hereby made, is shown in Fig. 1 and comprises in general a base 11 rotatably supporting a bowl 12 thereon beneath a motor unit 13 which drives two depending interdigitating beaters 14 disposed in the bowl. The motor unit 13 is carried by a support 15 pivoted as at 16 to move the beaters in and out of the bowl 12 and a handle 17 is secured to the motor unit for removing and managing the motor unit and beaters away from the base and support.

Between a rear cap member 18 and the front portion of the motor unit 13 is located a rotatable speed control adjusting ring 20. As more particularly shown in Fig. 2, this ring is rotatably mounted upon the housing frame section 21 and is provided with identical cams 22 on opposite sides thereof (Fig. 3) to receive the ends of a yoke 23 whose center portion 24 is slidably mounted in a guide opening 25 provided through a boss 26 in the rear of the cap 18. At its center, an adjusting screw 27 is provided in the yoke where it is located in axial alignment with the armature shaft 28 of the motor. Rotation of the ring 20 varies the depth of the cams 22 with respect to the yoke 23 and moves the yoke 23 in and out in an axial direction in cooperation with a compression spring 30. The head of the adjusting screw 27 is the work point for adjusting the speed control governors embodying the invention.

Before describing the several embodiments of the governor itself, reference is made to Fig. 12 showing the wiring diagram in which the governor comprises a pair of make and break contacts 31 and 32, one of which is electrically connected to a collector or slip ring illustrated by a circle 33, and the other is electrically connected to a second slip ring illustrated by a circle 34. Connections from the motor circuit to the slip rings are made by brushes 35 and 36 respectively, and these brushes are connected in parallel with a 200 ohm resistor 37 and an arc suppressing condenser 38. The condenser absorbs the surges of current which are caused by the making and breaking of the contact and serves to reduce sparking at the contacts, whereas the resistor 37 serves as a ballast resistor to carry part of the current and thereby reduce the voltage drop across the contacts.

An "on" and "off" switch 40 is connected in series with the centrifugal contacts but in parallel with the condenser 38 so that any tendency for the switch 40 to arc when opened under load will be cushioned by the condenser. Otherwise, the network of the governor contacts, condenser, resistance, and "on" and "off" switch is connected in series with the field windings 41 and the armature windings 42 of the motor. It will thus be observed that the governor make and break contacts are adapted to make and break the motor circuit and by so doing they control the speed of rotation of the motor by opening above a certain speed and closing below that speed.

Various speed settings throughout an armature speed range of approximately 2000 to 15,000 R. P. M. are accomplished in one embodiment by varying the position of the centrifugally influenced elements in the governor which as shown in Figs. 2 to 5 comprises a body 43 made of an insulating material such as Bakelite having a hub portion 44 secured to the armature shaft 28. The slip rings mentioned in connection with Fig. 2 are indicated at 33 and 34 where they constitute inserts cast integrally with the Bakelite when the body is formed. A radially extending flange 45 on the body carries a multiplicity of fan blades 46 around its periphery designed to rotate in one direction to circulate cooling air with greatest efficiency and provides a cavity 47 in the end face thereof in which is mounted the governor contacts upon brackets 48 and 50. The slip ring 33 is provided with a radially extending flange 51 which is connected by means of rivets 52 with the bracket 48 to make electrical connection therewith, and the slip ring 34 is provided with a radially inturned flange 53 which is electrically connected to the bracket 50 by a securing rivet 54 extending through the hub 44 of the governor body 43.

In the embodiment shown in Figs. 2 to 5 inclusive, both brackets carry leaf springs, an arcuately and inwardly curved leaf spring 55 upon the outer bracket 48, and an outwardly tensioned leaf spring 56 carried by the bracket 50. The two springs carry the governor contacts 57 which are preferably constructed of a suitable metal such as tungsten or an alloy adapted to break the current repeatedly for long periods of time without pitting.

The spring members 55 and 56 are preferably made of tempered steel and are supported eccentrically with respect to the center or axis of rotation of the shaft 28 with the springs pointing in the direction of rotation of the fan as indicated by the arrow 58. In their eccentric position, centrifugal force tends to move both springs radially outwardly since this force acts upon the mass of the springs and contacts. Consequently, at high speeds, whenever the inner spring 56 is free of restraint the springs will occupy the relative position shown in Fig. 5, in which the outer spring has flexed outwardly under centrifugal force and the inner spring 56 as urged both by its own tension and by centrifugal force follows the outer spring outwardly, depending upon the position imposed upon it by a pull rod 60 operated by a control lever 61 pivoted to a bracket 62 and provided with an insulating button 63 located approximately at the center of rotation where it rides against the head of the yoke carried screw 27. Thus as the yoke 23 is moved axially back and forth it displaces the control lever 61 in a relationship by which the pull rod 60 moves the contact upon the spring 56 with respect to the contact upon the spring 55.

It will be noted, as shown in Figs. 4 and 5, that the outer spring 55 is disposed in a position substantially chordal to the circle transcribed by the contact 57 carried thereby when rotating and, as already mentioned, this position is one in which the free end of the spring 55 points in the direction of rotation. The contacts because of the natural inwardly curved resting position of the spring 55 and the normal outwardly curved position of the spring 56, although drawn inwardly by the pull of the pull rod 60, are normally in contact with each other. When the "on" and "off" switch 40 is closed, current passes through the contacts 57 to energize the motor and rotate the armature. The armature quickly speeds up due to the impressed current and, as the armature begins to rotate, the spring 55 is subjected to centrifugal action. This spring tends to move outwardly more and more as the speed increases until a speed is reached at which the contact upon the spring 56 is restrained against further movement outwardly by the setting of the control lever 61 in relationship to the yoke 23, whereupon engagement between the two contacts 57 is broken.

The major portion of the current theretofore passing through the motor is thereby stopped and the motor tends to slow down. With the slow-down, the tendency of the spring 55 to continue to run at the speed imposed upon it constitutes an inertia effect which tends to close the contact 57 prematurely with a pronounced wrapping action. This inertial influence is in a direction for assisting the tension of the spring 55. This inertial action serves as an additional momentary force to increase the frequency with which the spring 55 operates to make and break the contacts 57.

The more rapidly the contacts make and break the smoother will be the operation of the motor at any given speed. In those instances where as here the spring 55 is given a curved contour, flexure under the influence of centrifugal force tends to change or dampen the potential harmonic of oscillation sufficiently to minimize any grouping tendency of the makes and breaks in the system. However, it is preferred to punch an opening 64 in the upper spring at a distance spaced from the contact about one-third to one-half way toward the bracket 48, which aperture divides the potential vibration of the spring into discordant portions having different moduli of vibration. The opening, however, is not enough to weaken the spring materially but it is large enough to introduce a secondary moment of flexure. Moreover, a small brass rivet element 65 is located in the opening with the head disposed radially inwardly and the loose end thereof flattened so that the rivet will not fall out of the opening yet be loosely mounted therein to jiggle freely under the influence of the spring's vibration in the speed-ups and slow-ups of the armature shaft induced by making and breaking the contacts.

It has been noted that with this rivet thus located, all tendency for makes and breaks to be grouped is eliminated throughout the speed range to which the governor contacts may be set to break. The looseness and separate mobility of the rivet as imposed upon the spring in its operation under the influence of centrifugal force dampens any recurrent periodicity inherent in the spring action without setting up any dominant modulus of its own.

As the result of these constructions and arrangements of elements, pulsation, spurting or loping in the motor is eliminated at beater shaft speeds as low as 100 R. P. M., and no "beat" effect is engendered throughout the range of adjustment when the motor is operated upon A. C. current.

In Figs. 6 and 7 an embodiment of the invention is illustrated in which the centrifugal element is balanced to be adjusted by rotation about an axis located off-center with respect to the normal axis of rotation of the armature whereby the centrifugal effect upon the centrifugal responsive elements is varied without varying the tension upon the spring or its natural high modulus of vibration.

In this particular embodiment one of the contacts 57a is carried rigidly by a bracket 50a mounted upon an insulating disc 66 rotatably mounted by a rivet 67 similar to the rivet 54 shown in Fig. 2. This rivet is in electrical contact with a bracket 68 which supports the spring 55a. Rotation of the disc 66 is accomplished by a push rod 60a operated by a control lever 61a urged outwardly by a torsion spring 70 intertwined between the lever 61a and the pivotal support bracket 62. The normal resting position of the centrifugal control is indicated in Fig. 7 to which position it is moved by the action of the torsion spring 70.

Whenever the yoke 23 is moved inwardly against the button 63 on the control lever 61a the disc 66 is drawn to the position shown in Fig. 6. The normal resting position is the high speed setting as shown in Fig. 7, whereas the position shown in Fig. 6 is the low speed setting.

The tension imposed upon the spring 55a to force engagement between the contacts 57a is determined and maintained constant at a factor in which the spring will separate the contacts under centrifugal action as shown in Fig. 6 at a motor speed of approximately 2700 R. P. M. to operate the beaters at a little less than 200 R. P. M., preferably between 150 and 200 R. P. M. Then when the disc 66 is rotated in clockwise direction about its own axis 67 as when the yoke 23 is moved outwardly by the cam 22 to attain a higher speed and the control lever 61a follows the influence of the torsion spring 70, the direct radial component or angle of centrifugal effort upon the spring is reduced, thereby making it necessary for a higher speed to be attained again before sufficient centrifugal influence upon the spring is again attained to cause separation of the contacts.

Thus, although the spring requires at all times a predetermined degree of centrifugal influence for it to separate the contacts, the speed control varies with the angularity of an increasing or decreasing centrifugal force upon the spring. Spoken of another way, the spring is foreshortened at higher speeds to the direct radial centrifugal force components and a higher speed is required before the component of centrifugal force effective upon the spring is great enough to cause separation of the contacts.

In view of the fact that the tension upon the spring 55a never varies, this spring can be greatly shortened to increase its modulus of vibration. In fact, it can be shortened enough that it makes and breaks the contacts as much as 600 times a second at the lower speeds and, in the preferred embodiment as shown, a rivet 65 is also provided as already described to assure elimination of any grouping tendency that might be present with the spring.

With the embodiment illustrated in Figs. 6 and 7, a further effect worthy of note is present. The inertial action of the spring closing the contacts when the motor begins to speed up is dispensed with above the lower speeds. This transpires when the supporting point on the bracket 69 and the contact carried by the spring 65 pass a point of equidistance from the axis of armature rotation. The point on the bracket considered in this connection is that point where the spring begins to flex.

Referring to Figs. 8 to 11 inclusive, a centrifugal responsive device is illustrated comprising a capsule 80 made preferably of metal having a contact ring 81 in the closed end thereof. A fused glass ring 82 closing the open end of the capsule supports a tubular atmosphere evacuation element 83 and this tube in turn supports at its inner end the stationary end of a flat spring 55b whereby its free end carries a contact 57b in juxtaposition to the ring 81.

The formation of this device enters into the invention since the spring 55b is mounted upon the tube 83 by which the atmosphere inside of the capsule 80 is exhausted or established. The spring 55b has slight recesses 84 on its edges into which the end of the tube 83 is swaged as at 85. The recesses define shoulders 79 which limit the depth to which the spring is inserted into the tube, and the inserted portion of the spring is held snugly in the tube 83, the width of the spring being slightly in excess of the inside diameter of the tube sufficiently so that the spring is supported in a way equivalent to a press fit. This leaves openings on opposite sides of the spring through which gases or liquids can be moved in or out of the capsule.

As shown in Fig. 8, the tube 83 has been connected to an evacuating device and preferably Freon has been injected into the capsule to provide an arc quenching inert atmosphere. Once the Freon or any other suitable inert atmosphere is in the tube and the tube is purged of all oxygen, the outer end of the tube 83 is squeezed shut as at 87 to seal the Freon in there in a well-known manner.

As shown in Figs. 9 and 10 there is an appreciable space between the contact 57b and the contact ring 81. The capsule after it is formed as shown in Fig. 10 is mounted in an anvil 91 carried by a master rotating element such as that indicated at 90 in Fig. 11 in which position the capsule is connected in series in a circuit such as Fig. 12 of a test motor by one connection being established to the tube 83 through a spring clamp 92 engaging the flattened portions 87 thereof, and the other connection being established by contact between the anvil and the wall of the capsule. A lever 93 pivoted as at 94 off-center of the axis of rotation of the rotating element 90 as indicated at 95, carries at its outer end a swaging piston 96 which reciprocates in supported relationship through a mounting ring 97. The piston 96 is capable of moving outwardly against the bottom side of the capsule 80 as at 98 to flatten same and swage the contact ring 81 upwardly when inward pressure is directed against the arm 93 of the lever for that purpose.

When the capsule is thus mounted upon the test or sample motor in this manner the current is turned on and the motor begins to rotate slowly under the influence of current passing through the ballast resistor 37. Pressure is then applied against the lever 93 as at 95 and a piston 96 is forced upwardly to swage the ring contact 81 into engagement with the spring supported contact 57b. When this engagement is established, the motor begins to run upon current passing through the contacts. This speeds up the motor and by means of a tachometer secured to the motor shaft or a beater shaft the speed setting of the capsule can be determined. Upward displacement of the swaging piston 96 is continued until the minimum low speed desired is read upon the tachometer. By this process of adjustment the correct tension is imposed upon the spring 55b and thereafter will remain a constant. All that remains to be done is to stop the motor, remove the capsule and mount it in a motor as shown in Fig. 8 where the capsule is mounted upon a disc 66a for rotary displacement in a manner similar to that described in connection with the embodiment shown in Figs. 6 and 7.

Not only does the provision of such a capsule as that shown in 80 make it possible to adjust all capsules to a predetermined speed upon a master test motor and thereby eliminate subsequent adjustments in individual motors, but the arc suppressing qualities of the inert atmosphere surrounding the contacts eliminates all possibility of arcing and increases indefinitely the life of the governor contacts. Furthermore, the governor contacts are not contaminated by foreign particles and debris carried by the cooling air that is circulated through the motor by the fans 46.

Although vacuum may be employed in the capsule 80, such requires a purification of all elements which is not necessary when Freon is used, or an inert gas or atmosphere which will not react appreciably with the material of the contacts and capsule under electric arc discharge. Furthermore, where the arc suppressing atmosphere is provided, the ballast resistance 37 can be increased to as much as 250 ohms without deleterious effects upon the contacts 57b and 81. Increasing the resistance of the ballast resistance enables this ballast resistance to operate much cooler even at comparatively low speeds. As a matter of fact, the ballast resistor is not entirely necessary when the inert atmosphere capsule 80 is employed. It is preferred, however, to use a surge condenser 36 at all times, as shown, of approximately .08 mfd. capacity to provide sharp breaking of the current.

Consequently, having thus described the invention and certain embodiments thereof, it will be readily apparent to those skilled in the art how the objects set forth are attained and how various and further changes and modifications may be made to accomplish the objects set forth without departing from the spirit of the invention, the scope of which is commensurate with the appended claims.

What is claimed is:

1. A speed control governor comprising a body rotatable about a predetermined axis, collector rings upon said body, a centrifugally actuated switch mounted on said body at a point spaced from the axis of rotation and including a leaf spring having an aperture therein intermediate its ends, a pair of contact elements one of which is supported on the spring adjacent one end thereof, said contacts being connected electrically with said rings, and a freely movable elongated element extending through said aperture in substantially a radial direction and upset upon the opposite ends to hold it loosely in place upon said spring, said element having a weight component less than the weight of said spring.

2. A speed control governor comprising a body rotatable about a predetermined axis, collector rings upon said body, a centrifugally actuated switch mounted on said body at a point spaced from the axis of rotation and including electric make and break contacts and an elongated spring carrying one of said contacts adjacent one end of the spring to cooperate with the other contact, and an element loosely mounted upon said spring at a point intermediate its ends for limited lateral movement in a direction transverse to a radial line passing through it, said element having a weight component less than the weight of said spring.

3. A speed control governor comprising a body rotatable in one direction about a predetermined axis, collector rings upon said body, a centrifugally actuated switch mounted on said body at a point spaced from the axis of rotation and including an elongated spring having a reduced cross sectional area intermediate its ends and a pair of contact elements, one of which is supported on the spring adjacent one end thereof, one of said contact elements being connected electrically with said ring, and a freely movable elongated element loosely mounted upon said spring at said reduced cross sectional area for limited movement in a direction longitudinally of said spring having a weight component less than the weight of said spring and operating to oppose harmonic cycling of the spring without setting up one of its own.

4. In a centrifugal switch the combination of a rotary member, a pair of contacts movable with respect to each other, a resilient element mounting one of said contacts upon said member for rotation therewith at a location disposed eccentric to the axis of rotation of said rotary member, and means carried by said resilient element including a member loosely secured to said element and carried thereby at a point of resiliency on said element.

5. In a speed regulating apparatus for an appliance driving electric motor, a pair of contacts in circuit with the winding of the motor and rotatable with its armature, a leaf spring carrying one of said contacts having its free end foremost in the direction of rotation of the motor armature and its anchored end trailing thereto, said leaf spring carrying one of said contacts being at all times free to respond centrifugally and inertially to the rotation and variations in rotational speeds of the motor armature, and said leaf spring having a normal curvature and spring tension opposing the centrifugal effects of said armature rotation, said normal curvature and spring tension receiving inertial assistance from the weight of the free end of the spring during deceleration of the armature to respond by a wrapping effect of its foremost free end by accelerated movement of the contact carried thereby radially inwardly momentarily ahead of the normal movement of the contact under declining centrifugal force, and means for supporting the other contact at a predetermined position against outward centrifugal movement thereof.

6. In a centrifugal switch the combination of a rotary member, a pair of contacts movable with respect to each other, a resilient element mounting one of said contacts upon said member for rotation therewith at a location disposed eccentric to the axis of rotation of said rotary member, means for shifting the contacts to change the location at which they engage with respect to the axis of rotation, and means carried by said resilient element including a member loosely secured to said element at a point of resiliency of said element.

7. A speed control governor comprising a body adapted to rotate in one direction, collector rings upon said body, a centrifugally responsive switch mounted on said body including a pair of contacts connected electrically with said rings and a resilient element disposed eccentrically to the axis of rotation of the body, said resilient element being supported on the body at one end and supporting at its other end one of the contacts, said contact leading said supported end of the resilient element during rotation in said one direction, and movable solely in response to centrifugal and inertia forces during rotation of said body, and means for supporting the other contact at a predetermined position against outward centrifugal movement thereof.

8. A speed governor for a motor comprising a rotatable element mounted for rotation about a predetermined axis of rotation in association with the motor, a member mounted on the rotatable element for pivotal movement about a second axis located substantially parallel and eccentrically to the first axis, a centrifugally influenced resilient element supported on said member and carrying an electrical contact, said contact being a part of a switch adapted to be connected in circuit with said motor.

9. A speed governor for a motor comprising a rotatable element mountable for rotation about a predetermined axis of rotation, a member mounted for pivotal movement about a second axis located eccentrically to the first axis, a centrifugally influenced switch member carried by said member including a leaf spring, said spring being movable by said member from an approximately radially extending position to a position approximately normal to the radius with respect to the first axis of rotation, said switch member being adapted to be connected in circuit with said motor.

10. A speed governor for a motor comprising a rotatable element mountable for rotation about a predetermined axis of rotation, a member monted for pivotal movement about a second axis located eccentrically to the first axis, a pair of switch contacts carried by said member, one of said contacts being supported on a centrifugally influenced resilient contact support, said contacts being maintained under a constant closing pressure when resting and at their highest speed adjustment, said switch member being adapted to be connected in circuit with said motor.

11. A centrifugal switch comprising a sealed capsule having a predetermined atmosphere therein, a movable switch contact therein, said capsule having an electro-conductive section collapsed over a portion thereof inwardly towards said contact.

12. A centrifugal switch comprising a sealed capsule having a predetermined atmosphere therein, a resiliently mounted switch contact therein, a switch contact mounted inside and upon the wall of the capsule, said capsule having an electro-conductive section collapsed over a portion thereof to support the second contact in normal engagement with the first contact.

13. A centrifugal switch comprising a rotatable shaft, a member rotatably carried by said shaft, a sealed capsule substantially evacuated of free oxygen mounted on said member eccentrically to the shaft, said capsule having a normally closed switch therein including two contacts and a resilient element resiliently supporting one of the switch contacts, said capsule rigidly supporting the other contact and the resilient element with respect to each other, and external means for electrically connecting said switch in circuit with an electromotive device, said capsule being mounted with said other contact disposed closer to the axis of rotation of said shaft than the resiliently mounted contact.

14. In a centrifugal speed governor, the combination including a rotatable member carrying a sealed capsule having an oxygen free atmosphere therein, said capsule also having two cooperating switch contacts movable with respect to each other disposed therein, a resilient element supporting one of the contacts and having a predetermined weight component influenced by centrifugal action when the capsule is rotated bodily about the axis of rotation of said member, said capsule rigidly supporting the contact and the resilient element with respect to each other, and means for connecting said contacts in an electrical circuit.

15. In a centrifugal speed governor the combination including a rotatable member, a centrifugal switch element carried by said member, said element comprising a sealed capsule evacuated of free oxygen, two cooperating switch contacts movable with respect to each other mounted in said capsule and including a spring element supporting one of the contacts, said element and its contact having a predetermined vibration moment under the influence of centrifugal force when the member is rotated, the spring being disposed eccentrically to the axis of rotation, and means for connecting said contacts in an electrical circuit.

16. A centrifugal switch element comprising a sealed capsule having two cooperating switch contacts therein movable with respect to each other one of which is supported by a leaf spring having a predetermined weight component influenced by centrifugal action when the capsule is rotated bodily about a predetermined axis, and means for engaging said contacts in electrical connection including an upset portion upon the wall of said capsule supporting the other contact.

17. An electrical switch comprising a capsule collapsible at one end, a closure for the capsule including a collapsible tube, a spring contact element rigidly carried at one end by said tube and extending into said capsule to a point within said collapsible end, said tube being closed at its outer end after free oxygen has been evacuated from said capsule and a stationary contact element carried by a wall of said capsule at the collapsible end and cooperating with the first mentioned contact element.

18. An electrical switch comprising a capsule, a contact ring in said capsule at one end, a closure for the capsule including a collapsible tube, a spring contact element carried by said tube and extending into said capsule into juxtaposition with said contact ring, said tube being closed at its outer end and serving as an electrical connection.

19. An electrical switch comprising a metal capsule, a closure for the capsule including a collapsible tube mounted to extend through an electrically nonconductive material, a leaf spring carrying a contact, said spring being mounted in the inner end of said tube and extending into said capsule, and a cooperating contact in said capsule fixed with respect to a wall thereof, said tube being open to the interior of said capsule along the sides of the spring.

20. An electrical switch comprising a capsule, means for sealing the capsule including a ring of electrically nonconductive material, a tube received longitudinally through said ring, a spring carried by said tube, a loosely mounted element upon the spring, said spring being of less transverse dimension than the outside diameter of the tube, and cooperating contact elements carried by said spring and capsule said spring and cooperating contact elements being disposed inside the capsule.

21. In a centrifugal control for varying the speed of an electric motor the combination of a spring mounted switch contact, means for rotating said spring mounted contact about a predetermined axis to subject same to the influence of centrifugal force, and rotatable means for mounting the spring mounted contact having an axis located eccentric to said rotating means whereby to modify the response of the contact spring to the centrifugal force.

22. In a centrifugal control for varying the speed of an electric motor the combination of a spring element, a switch contact carried on the element, a rotating member carrying said spring element and contact about a predetermined axis subjecting same to the influence of centrifugal force, and means for mounting the spring element and contact for rotation about a second axis located eccentrically and parallel the axis of said rotating member whereby to foreshorten the effective length of said element with respect to a radially directed centrifugal force, the weight distribution of the last mentioned means being such that it remains in dynamic balance so that its rotation does not disturb the dynamic balance of the rotating member.

23. In a centrifugal control for varying the speed of an electric motor the combination including a member adapted to be rotatably driven by said motor, means carried by said member for supporting a resilient element having a switch contact, the influence of centrifugal force being such as to cause said resilient element and contact to vibrate, a second cooperating switch contact carried by said means, and means for moving the first mentioned means about a second axis located eccentrically to the axis of rotation of said member to vary the centrifugal force component effective upon the resilient element and its contact and thereby varying the speed of the motor, said cooperating contacts being connected in the circuit supplying power to said motor.

FRED A. MASHERIS.
KALMAN TANKO.

References Cited in the file of this patent

UNITED STATES PATENTS

| Number | Name | Date |
| --- | --- | --- |
| 1,313,856 | Cavanagh | Aug. 19, 1919 |
| 1,836,654 | Dorn et al. | Dec. 15, 1931 |
| 2,050,665 | Matthews et al. | Aug. 11, 1936 |
| 2,098,226 | Charter | Nov. 9, 1937 |
| 2,111,960 | Begerow | Mar. 22, 1938 |
| 2,138,912 | Foss | Dec. 6, 1938 |
| 2,195,041 | Von Schlippe | Mar. 26, 1940 |
| 2,262,912 | Behar | Nov. 18, 1941 |
| 2,271,813 | Clayton, Jr. | Feb. 3, 1942 |
| 2,281,711 | Peck et al. | May 5, 1942 |
| 2,367,441 | Schwinn | Jan. 16, 1945 |
| 2,457,218 | Ferrell | Dec. 28, 1948 |

FOREIGN PATENTS

| Number | Country | Date |
| --- | --- | --- |
| 1,891 | Great Britain | Nov. 2, 1905 |